(12) United States Patent
Okumura et al.

(10) Patent No.: US 10,876,862 B2
(45) Date of Patent: Dec. 29, 2020

(54) ROTARY ENCODER

(71) Applicant: NIDEC SANKYO CORPORATION, Suwa-gun Nagano (JP)

(72) Inventors: Hirokatsu Okumura, Suwa-gun Nagano (JP); Yutaka Saito, Suwa-gun Nagano (JP); Hitoshi Joko, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 219 days.

(21) Appl. No.: 15/895,288

(22) Filed: Feb. 13, 2018

(65) Prior Publication Data

US 2018/0231402 A1 Aug. 16, 2018

(30) Foreign Application Priority Data

Feb. 14, 2017 (JP) .................................. 2017-024873

(51) Int. Cl.
*G01D 5/244* (2006.01)
*G01D 5/245* (2006.01)

(52) U.S. Cl.
CPC ....... *G01D 5/24476* (2013.01); *G01D 5/2451* (2013.01); *G01D 5/24485* (2013.01); *G01D 5/24495* (2013.01)

(58) Field of Classification Search
CPC ........ G01D 3/028; G01D 5/142; G01D 5/145; G01D 5/147; G01D 5/16; G01D 5/165; G01D 5/24476; G01D 5/24485; G01D 5/24495; G01D 5/2451; G01R 33/02; G01R 33/025; G01R 33/09; G01R 33/007; G01R 33/0082; H02P 6/17; H02P 21/18

USPC .......... 324/207.12, 207.13, 207.25; 702/151
See application file for complete search history.

(56) References Cited

U.S. PATENT DOCUMENTS

| 5,274,328 A * | 12/1993 | Begin | ..................... G01B 7/02 |
| | | | 324/202 |
| 5,406,200 A * | 4/1995 | Begin | .................... G01B 7/003 |
| | | | 324/207.12 |
| 8,219,603 B2 * | 7/2012 | Aono | ................... G01D 5/2448 |
| | | | 324/207.11 |

(Continued)

FOREIGN PATENT DOCUMENTS

JP    2014194360 A    10/2014

*Primary Examiner* — Stevens L Yeninas
(74) *Attorney, Agent, or Firm* — Cantor Colburn LLP

(57) ABSTRACT

A rotary encoder may include a magnet, a magnetic sensor, and a control part configured to calculate a rotation position of the rotor body based on an output signal outputted from the magnetic sensor. The control part includes a temperature detecting section configured to detect temperature of the magnetic sensor, an offset voltage calculation section configured to calculate an offset voltage of the magnetic sensor based on the output signal from the magnetic sensor, and a storage section which stores a slope and an intercept of a primary approximate expression calculated by a relationship between temperatures previously detected by the temperature detecting section and the offset voltages previously calculated by the offset voltage calculation section. The control part executes offset voltage estimate processing based on the slope and the intercept stored in the storage section and correction processing which corrects the output signal from the magnetic sensor.

7 Claims, 4 Drawing Sheets

(56) References Cited

U.S. PATENT DOCUMENTS

| | | | | |
|---|---|---|---|---|
| 8,311,760 B2* | 11/2012 | Hohe | ............... | G01D 3/0365 |
| | | | | 324/207.12 |
| 2001/0004215 A1* | 6/2001 | Kubota | ............ | F02D 11/106 |
| | | | | 324/685 |
| 2005/0028614 A1* | 2/2005 | Saito | ................. | G01D 5/145 |
| | | | | 73/862.333 |
| 2006/0076480 A1* | 4/2006 | Kiriyama | ......... | G01D 5/24452 |
| | | | | 250/231.16 |
| 2010/0050731 A1* | 3/2010 | Granig | .............. | G01D 5/145 |
| | | | | 73/1.11 |
| 2013/0214776 A1* | 8/2013 | Holman | ............ | G01R 33/098 |
| | | | | 324/252 |
| 2013/0300402 A1* | 11/2013 | Liu | .................. | G01R 33/09 |
| | | | | 324/202 |
| 2013/0335065 A1* | 12/2013 | Fugate | ............ | G01R 33/0035 |
| | | | | 324/202 |
| 2016/0131722 A1* | 5/2016 | Ausserlechner | ...... | G01R 33/07 |
| | | | | 324/225 |
| 2016/0252375 A1* | 9/2016 | Kikuchi | ........... | G01D 5/24495 |
| | | | | 702/94 |
| 2017/0299684 A1* | 10/2017 | Ausserlechner | ... | G01R 33/0082 |
| 2018/0019700 A1* | 1/2018 | Suzuki | ............... | H02P 29/64 |
| 2018/0100985 A1* | 4/2018 | Maede | ............... | G01D 3/036 |
| 2019/0265069 A1* | 8/2019 | Roberts | ............ | G01D 5/145 |

\* cited by examiner

ROTARY ENCODER

CROSS REFERENCE TO RELATED APPLICATION

The present application claims priority under 35 U.S.C. § 119 to Japanese Application No. 2017-024873 filed Feb. 14, 2017, the entire content of which is incorporated herein by reference.

FIELD OF THE INVENTION

At least an embodiment of the present invention may relate to a rotary encoder, especially, a magnetic type rotary encoder.

BACKGROUND

A magnetic type rotary encoder which utilizes a magneto-sensitive element such as a magneto-resistance effect (MR) element or a Hall element has been known as a device for detecting a rotation position of a rotor body with respect to a fixed body. In the rotary encoder, in order to maintain stable detection accuracy even in a case that ambient temperature is varied, it is required that influence of a temperature characteristic of a magneto-sensitive element, especially, influence of a temperature characteristic of an offset voltage (center voltage of output signal) is suppressed to a minimum.

Japanese Patent Laid-Open No. 2014-194360 discloses that a temperature monitoring resistance film and a heating resistance film are formed on a circuit board where a magneto-sensitive film (magneto-sensitive element) is formed and, based on a temperature monitoring result of a resistance value of the temperature monitoring resistance film, electric power is supplied to the heating resistance film to heat the magneto-sensitive element to a set temperature and thereby the temperature of the magneto-sensitive element is adjusted. According to this method, even in a case that ambient temperature is varied, the temperature of the magneto-sensitive element is kept constant and thus influence of the temperature characteristic of the magneto-sensitive element can be minimized and stable detection accuracy is maintained.

However, according to the method described in the above-mentioned Patent Literature, when started in a state that temperature is low compared with normal operation, it takes time for setting the temperature of the magneto-sensitive element to be constant and a detection error may be easily generated caused by temperature difference in the circuit board due to difference of positions of the temperature monitoring resistance film and the magneto-sensitive element. Further, as for an offset voltage of the magneto-sensitive element, the offset voltage in the previous operation is used as an offset voltage when started for coping with change over time. However, this method is not satisfactory because a temperature characteristic of an offset voltage is not considered. In other words, when the offset voltage stored in the normal operation in which temperature is high is used at starting when temperature is low, a detection error becomes large.

SUMMARY

In view of the problem described above, at least an embodiment of the present invention may advantageously provide a rotary encoder in which influence due to a temperature characteristic of a magneto-sensitive element is suppressed.

According to at least an embodiment of the present invention, there may be provided a rotary encoder structured to detect a rotation position of a rotor body with respect to a fixed body. The rotary encoder includes a magnet which is provided in one of the fixed body and the rotor body, a magnetic sensor part which is provided in the other of the fixed body and the rotor body and is structured to detect a magnetic field change of the magnet, and a control part configured to calculate a rotation position of the rotor body based on an output signal outputted from the magnetic sensor part accompanied with rotation of the rotor body. The control part includes a temperature detecting section configured to detect temperature of the magnetic sensor part, an offset voltage calculation section configured to calculate an offset voltage of the magnetic sensor part based on the output signal from the magnetic sensor part, and a storage section which stores a slope and an intercept of a primary approximate expression which is calculated by a relationship between temperature previously detected by the temperature detecting section and the offset voltage previously calculated by the offset voltage calculation section. The control part executes offset voltage estimate processing which estimates an offset voltage of the magnetic sensor part from current temperature of the magnetic sensor part detected by the temperature detecting section based on the slope and the intercept which are stored in the storage section, and correction processing which corrects the output signal from the magnetic sensor part based on the estimated offset voltage. The control part calculates a rotation position of the rotor body by using a corrected output signal.

According to this rotary encoder, constant temperature control is not required to be performed at starting and thus correcting of an output signal is performed based on an appropriate offset voltage immediately after started and a rotation position of the rotor body can be detected with a high degree of accuracy.

In accordance with at least an embodiment of the invention, when a total sum of the temperatures previously detected is "A", a total sum of the offset voltages previously calculated is "B", a total sum of products of the temperatures previously detected and the offset voltages previously calculated is "C", and a total sum of squares of the temperatures previously detected is "D", the slope "a" and the intercept "b" are respectively obtained:

$a=(C-AB)/(D-A^2)$, and $b=(DB-CA)/(D-A^2)$.

In this case, even when the slope and the intercept stored in the storage section are required to be updated, they can be easily obtained.

Further, it may be structured that, in a case that a difference between the offset voltage calculated by the offset voltage calculation section at a predetermined temperature and the offset voltage estimated at the predetermined temperature is not less than a predetermined value, the control part updates the intercept stored in the storage section based on the difference. According to this structure, change over time of a temperature characteristic of the offset voltage can be coped and thus the offset voltage can be estimated with a further high degree of accuracy.

Further, the rotary encoder in accordance with at least an embodiment of the present invention may include a plurality of magnets and a plurality of magnetic sensor parts, and the control part is structured to calculate a rotation position of the rotor body based on a plurality of the output signals of the plurality of the magnetic sensor parts and to execute the offset voltage estimate processing and the correction processing for the plurality of the magnetic sensor parts. In this case, it may be structured that the plurality of the magnets includes a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body, and the plurality of the magnetic sensor parts includes at least one magnetic sensor part which faces the first magnet, and a magnetic sensor part which faces the second magnet. In addition, the plurality of the magnetic sensor parts includes a first magneto-sensitive element which is disposed so as to face a magnetized face of the magnet and is structured to output an "A"-phase signal in a sine wave shape accompanied with rotation of the rotor body, and a second magneto-sensitive element which is disposed so as to face a magnetized face of the magnet and is structured to output a "B"-phase signal in a sine wave shape having a phase difference of 90° from the "A"-phase signal accompanied with rotation of the rotor body. According to this structure, detection accuracy of a rotation position of the rotor body can be improved.

Further, it may be structured that the offset voltage calculation section executes forming a Lissajous waveform on a rectangular coordinate system based on the "A"-phase signal and the "B"-phase signal, selecting successive three points from a plurality of points equally dividing circumference of the Lissajous waveform, and calculating the offset voltage of at least one magnetic sensor part corresponding to the first magnet based on an intersecting point of perpendicular bisectors of two line segments formed by connecting successive two points of selected three points. According to this structure, even when the rotor body is capable of being rotated only over a limited angular range, the offset voltage can be calculated with a high degree of accuracy.

Further, it may be structured that the offset voltage calculation section executes forming a Lissajous waveform on a rectangular coordinate system based on the "A"-phase signal and the "B"-phase signal, specifying four points which are located in vicinities of four intersecting points of the Lissajous waveform and the coordinate axes, and calculating the offset voltage of the magnetic sensor part corresponding to the second magnet based on a predetermined value, the predetermined value being added to or subtracted from at least one of the "A"-phase signal and the "B"-phase signal so that the four points specified are substantially equally separated from an origin of the coordinate axes. According to this structure, even when distortion of the Lissajous waveform is large, the offset voltage can be calculated with a high degree of accuracy.

Further, each of the magneto-sensitive elements may include a magneto-resistance effect element. According to this structure, an "A"-phase signal and a "B"-phase signal can be easily obtained from one element.

Further, it may be structured that the temperature detecting section is configured to calculate the temperature of the magnetic sensor part by using a temperature sensor incorporated into a microcomputer which structures the control part. According to this structure, temperature of a magneto-sensitive element can be detected without using another element for monitoring temperature.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1A:
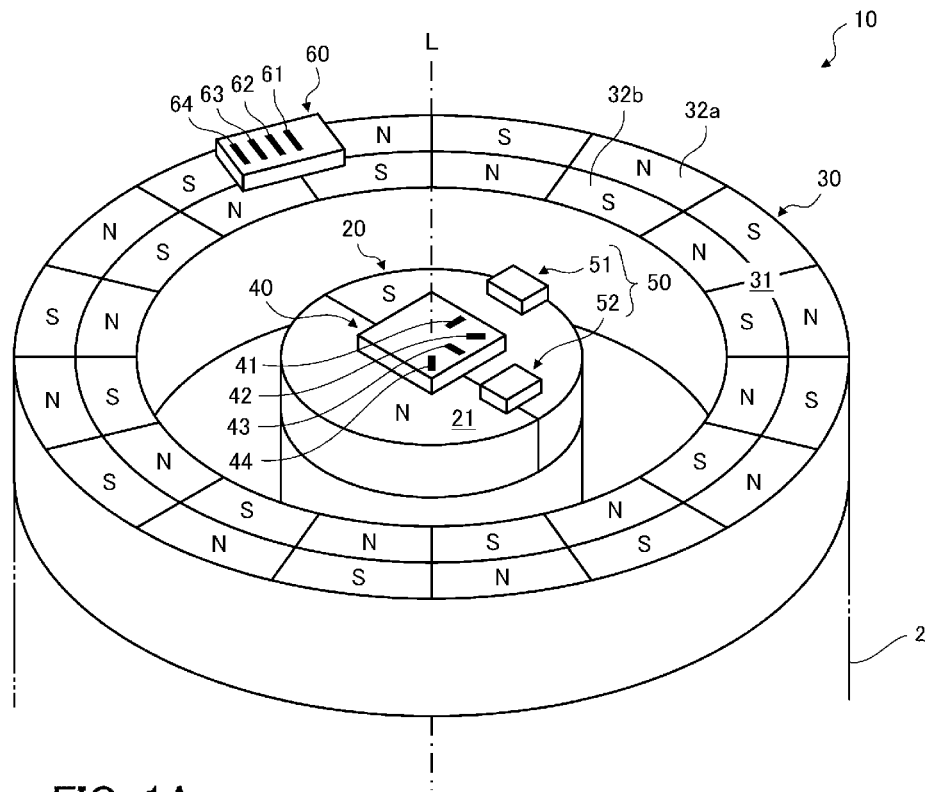
FIG. 1A and FIG. 1B are schematic views showing a structure of a rotary encoder in accordance with an embodiment of the present invention.
Figure 1B:
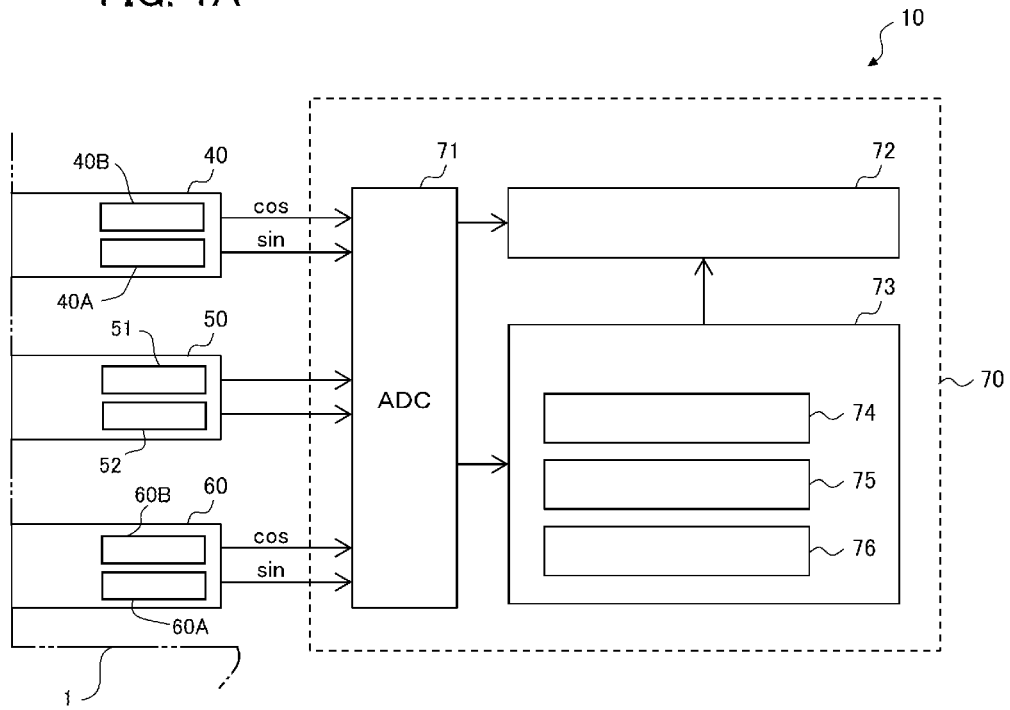

Embodiments of the present invention will be described below with reference to the accompanying drawings. A rotary encoder in at least an embodiment of the present invention is an encoder structured to detect a rotation position of a rotor body with respect to a fixed body. In the present specification, at least an embodiment of the present invention describes a rotary encoder in which a magnet is provided in a rotor body and a magnetic sensor part (magneto-sensitive element) is provided in a fixed body as an example. However, a structure of a rotary encoder is not limited to this structure and the structured may be reversed. In other words, at least an embodiment of the present invention may be applied to a rotary encoder in which a magneto-sensitive element is provided in a rotor body and a magnet is provided in a fixed body. FIG. 1A and FIG. 1B are schematic views showing a structure of a rotary encoder in accordance with an embodiment of the present invention. FIG. 1A is a schematic perspective view showing a rotary encoder in this embodiment and FIG. 1B is a block diagram showing the rotary encoder in this embodiment.

A rotary encoder 10 in this embodiment includes, as shown in FIG. 1A and FIG. 1B, a first magnet 20, a second magnet 30, a first magnetic sensor part 40, a second magnetic sensor part 50, a third magnetic sensor part 60 and a control part 70 (i.e., controller). The first magnet 20 and the second magnet 30 are provided in a rotor body 2 which is rotated with a rotation axis "L" as a center and are rotatable together with the rotor body 2. The first magnetic sensor part 40, the second magnetic sensor part 50 and the third magnetic sensor part 60 are provided in a fixed body 1. For example, the rotor body 2 is connected with an output shaft of a motor and the fixed body 1 is fixed to a frame of the motor. The first through third magnetic sensor parts 40, 50 and 60 are respectively connected with the control part 70 through amplifier circuits (not shown).

The first magnet 20 is structured of a disk-shaped permanent magnet (for example, bond magnet) which is disposed on the rotation axis "L" of the rotor body 2 and whose center is coincided with the rotation axis "L". The first magnet 20 is provided with a magnetized face 21 in which one "N"-pole and one "S"-pole are disposed in a circumferential direction. On the other hand, the second magnet 30 is structured of a cylindrical tube shaped permanent magnet (for example, bond magnet) which is disposed so as to surround an outer side in a radial direction of the first magnet 20 and whose center is coincided with the rotation axis "L". The second magnet 30 is provided with a ring-shaped magnetized face 31 in which a plurality of "N"-poles and a plurality of "S"-poles are alternately disposed in a circumferential direction. The magnetized face 31 of the second magnet 30 is formed with a plurality of tracks 32a and 32b (two tracks in this embodiment) which are disposed so as to be juxtaposed with each other in a radial direction of the rotor body 2. Each of the tracks 32a and 32b is formed with magnetic pole pairs of totaled "n" pieces ("n" is an integer not less than 2, for example, N=64) comprised of an "N"-pole and an "S"-pole. Two tracks 32a and 32b which are radially adjacent to each other are disposed so as to be displaced from each other in the circumferential direction and, in this embodiment, two tracks 32a and 32b are disposed so as to be displaced by one pole in the circumferential direction.

The first magnetic sensor part 40 and the second magnetic sensor part 50 are structured to detect magnetic field changes of the first magnet 20 and are respectively disposed so as to face the magnetized face 21 of the first magnet 20. The third magnetic sensor part 60 is structured to detect magnetic field changes of the second magnet 30 and is disposed so as to face the magnetized face 31 of the second magnet 30.

The first magnetic sensor part 40 includes two sensors (magneto-sensitive element) which are structured of four magnetic resistance patterns 41 through 44 each of which is comprised of two magneto-resistance effect (MR) elements. Specifically, the first magnetic sensor part 40 includes an "A"-phase sensor (first magneto-sensitive element) 40A structured to output an "A"-phase signal (sin) in a sine wave shape accompanied with rotation of the rotor body 2, and a "B"-phase sensor (second magneto-sensitive element) 40B structured to output a "B"-phase signal (cos) in a sine wave shape which has a phase difference of 90° with respect to the "A"-phase signal accompanied with rotation of the rotor body 2. The "A"-phase sensor 40A includes a magnetic resistance pattern 43 structured to output a "+a"-phase signal (sin+) in a sine wave shape and a magnetic resistance pattern 41 structured to output a "−a"-phase signal (sin−) in a sine wave shape which has a phase difference of 180° with respect to the "+a"-phase signal. Each of the magnetic resistance patterns 43 and 41 is comprised of two serially-connected MR elements. The two magnetic resistance patterns 43 and 41 are connected in parallel with each other to structure a bridge circuit. The "B"-phase sensor 40B includes a magnetic resistance pattern 44 structured to output a "+b"-phase signal (cos+) in a sine wave shape and a magnetic resistance pattern 42 structured to output a "−b"-phase signal (cos−) in a sine wave shape which has a phase difference of 180° with respect to the "+b"-phase signal. Each of the magnetic resistance patterns 44 and 42 is comprised of two serially-connected MR elements. Similarly to the "A"-phase sensor 40A, the two magnetic resistance patterns 44 and 42 are connected in parallel with each other to structure a bridge circuit.

The second magnetic sensor part 50 includes a first Hall element 51 and a second Hall element 52 which is disposed at a position separated from the first Hall element 51 by 90° with the rotation axis "L" as a center.

The third magnetic sensor part 60 includes two sensors (magneto-sensitive element) structured of four magnetic resistance patterns 61 through 64 each of which is comprised of two MR elements. Specifically, the third magnetic sensor part 60 includes an "A"-phase sensor (first magneto-sensitive element) 60A structured to output an "A"-phase signal (sin) in a sine wave shape accompanied with rotation of the rotor body 2, and a "B"-phase sensor (second magneto-sensitive element) 60B structured to output a "B"-phase signal (cos) in a sine wave shape which has a phase difference of 90° with respect to the "A"-phase signal accompanied with rotation of the rotor body 2. The "A"-phase sensor 60A includes a magnetic resistance pattern 64 structured to output a "+a"-phase signal (sin+) in a sine wave shape and a magnetic resistance pattern 62 structured to output a "−a"-phase signal (sin−) in a sine wave shape which has a phase difference of 180° with respect to the "+a"-phase signal. Each of the magnetic resistance patterns 64 and 62 is comprised of two serially-connected MR elements. The two magnetic resistance patterns 64 and 62 are connected in parallel with each other to structure a bridge circuit. The "B"-phase sensor 60B includes a magnetic resistance pattern 63 structured to output a "+b"-phase signal (cos+) in a sine wave shape and a magnetic resistance pattern 61 structured to output a "−b"-phase signal (cos−) in a sine wave shape which has a phase difference of 180° with respect to the "+b"-phase signal. Each of the magnetic resistance patterns 63 and 61 is comprised of two serially-connected MR elements. The two magnetic resistance patterns 63 and 61 are connected in parallel with each other to structure a bridge circuit.

The control part 70 (i.e., controller) is structured by using a microcomputer which includes a central processing unit (CPU), a random-access memory (RAM), a read-only memory (ROM) and the like. The control part 70 calculates a rotation position (absolute angle position) of the rotor body 2 based on output signals outputted from the first through the third magnetic sensor parts 40, 50 and 60.

Figure 2A:
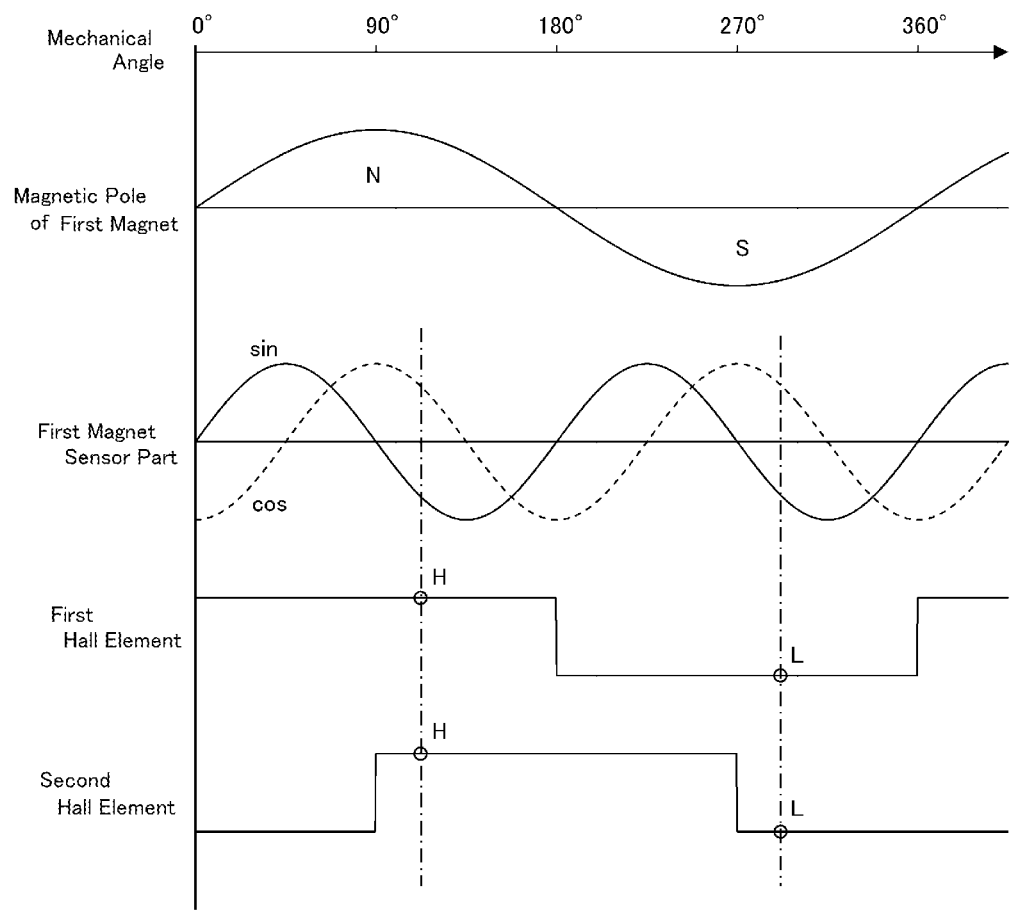
FIG. 2A and FIG. 2B are explanatory views showing a detection principle for an absolute angle position of a rotor body in a rotary encoder in accordance with an embodiment of the present invention.
Figure 2B:
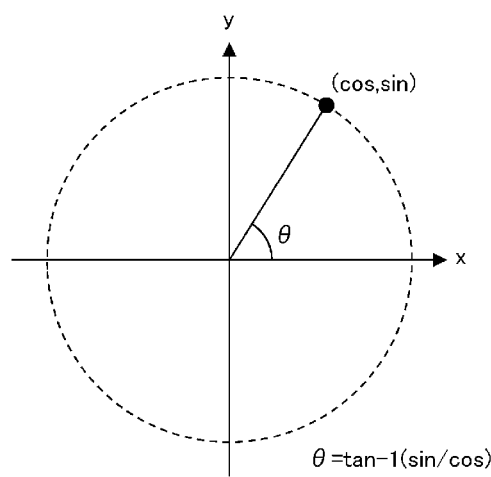

Next, a detection principle for an absolute angle position of the rotor body 2 in this embodiment will be described below with reference to FIG. 2A and FIG. 2B. FIG. 2A shows, with respect to change of a mechanical angle of the rotor body 2 from a specific reference position, a magnetic pole and an intensity of the first magnet 20, an output signal from the first magnetic sensor part 40, an output signal from the first Hall element 51, and an output signal from the second Hall element 52. FIG. 2B shows a relationship between the output signal and an electrical angle $\theta$. A mechanical angle indicates a geometrically or mechanically determined angle and an electrical angle indicates an angle determined by a phase of an output signal from a magneto-sensitive element. In FIG. 2A, output signals from the first and the second Hall elements 51 and 52 are indicated by a binary signal of "H" or "L" obtained through a comparator.

When the rotor body 2 is turned by a single rotation, the first magnet 20 also rotates once (360° rotation in a mechanical angle). Therefore, as shown in FIG. 2A, an "A"-phase signal (sin) and a "B"-phase signal (cos) are respectively outputted from the first magnetic sensor part 40 by two cycles, in other words, for 720° in an electrical angle (angle determined by a phase of an output signal). An electrical angle $\theta$ is calculated by a relational expression of "$\theta = \tan^{-1}(\sin/\cos)$" based on the "A"-phase signal and the "B"-phase signal as shown in FIG. 2B. However, the rotor body 2 rotates 720° in an electrical angle while the rotor body 2 rotates 360° in a mechanical angle and thus, an absolute angle position of the rotor body 2 cannot be obtained merely by calculation of the electrical angle θ. Therefore, two Hall elements 51 and 52 are utilized which are disposed at positions separated by 90° from each other with the rotation axis "L" as a center. In other words, a polarity of the magnetic field generated from the first magnet 20 is determined based on the output signals which are outputted from the two Hall elements 51 and 52. As a result, as shown by the alternate long and short dash line in FIG. 2A, it is determined which quadrant a rotation position in a mechanical angle is located in a plane coordinate system. In this manner, an absolute angle position of the rotor body 2 can be calculated.

On the other hand, each time the rotor body 2 turns by one pair of magnetic poles in a circumferential direction of the second magnet 30, similarly to the case shown in FIG. 2A, the third magnetic sensor part 60 outputs an "A"-phase signal (sin) of two cycles and a "B"-phase signal (cos) of two cycles (in other words, for 720° in an electrical angle). Therefore, based on the "A"-phase signal and the "B"-phase signal outputted from the third magnetic sensor part 60, an absolute angle position of the rotor body 2 is also calculated in an angle corresponding to one pair of the magnetic poles of the second magnet 30 by the similar principle for the first magnetic sensor part 40 described above. A detection resolution of an absolute angle position by the third magnetic sensor part 60 is higher than that by the first magnetic sensor part 40. Therefore, an absolute angle position of the rotor body 2 can be calculated with a high degree of resolution by combining these positions.

In a magnetic sensor provided with a bridge circuit structured of a plurality of MR elements, when respective temperature characteristics of magneto-resistance effect films structuring the MR elements are equal to each other, temperature variation cannot be generated in an output of the magnetic sensor. However, actually, temperature variation is generated in its output due to various factors, which causes a detection error. Therefore, in order to maintain stable detection accuracy even in a case that ambient temperature is varied, it is required that, especially, a temperature characteristic of an offset voltage (center voltage of an output signal) generated due to variations in MR elements and the like is accurately grasped to appropriately correct its output based on the offset voltage.

In this embodiment, the control part 70 is provided with a function for executing offset voltage estimate processing in which offset voltages of the respective magnetic sensor parts 40, 50 and 60 are estimated from a current temperature, and a function for executing correction processing in which output signals from the respective magnetic sensor parts 40, 50 and 60 are corrected based on estimated offset voltages. Therefore, for example, even at a time immediately after started when temperature is low compared to normal operation, an output signal is corrected based on an appropriate offset voltage and a rotation position of a rotor body is calculated by using the corrected output signal. As a result, a high degree of detection accuracy can be maintained.

Next, a functional structure of the control part 70 will be described below by mainly paying attention to a function regarding the offset voltage estimate processing with reference to FIG. 1B.

The control part 70 includes an A/D conversion section (ADC) 71, an angle calculation section 72 and an offset voltage estimation section 73. The offset voltage estimation section 73 includes a temperature detecting section 74, an offset voltage calculation section 75 and a storage section 76.

The ADC 71 converts analog signals outputted from the first through the third magnetic sensor parts 40, 50 and 60 into digital signals to output to the angle calculation section 72 and the offset voltage estimation section 73. The angle calculation section 72 calculates a rotation position of the rotor body 2 described above based on the output signals from the first through the third magnetic sensor parts 40, 50 and 60 converted into digital signals in the ADC 71. In this case, the angle calculation section 72 acquires estimated values of offset voltages of the first through the third magnetic sensor parts 40, 50 and 60 at a current temperature from the offset voltage estimation section 73 and the output signals are corrected based on the acquired estimated values of the offset voltages and then, a rotation position of the rotor body 2 is calculated by using the corrected output signals according to the calculation method described above.

The offset voltage estimation section 73 estimates offset voltages of the respective magnetic sensor parts 40, 50 and 60 at a current temperature detected by the temperature detecting section 74 based on information stored in the storage section 76 regarding temperature characteristics of the offset voltages of the respective magnetic sensor parts 40, 50 and 60. Specific information regarding temperature characteristics will be described below.

The temperature detecting section 74 includes a temperature sensor (thermal diode) which is incorporated in a CPU of a microcomputer which structures the control part 70 and an output value of the temperature sensor is calculated as a current temperature of the respective magnetic sensor parts 40, 50 and 60. Temperature detection (temperature arithmetic processing) is, for example, executed once for every communication period (for example, communication period for calculating a rotation speed) with a host control device which controls the rotary encoder 10. The temperature arithmetic processing is finished in several tens of μsec and thus the processing can be surely completed within a communication period which is sufficiently longer than the time of the temperature arithmetic processing. When temperature detection is executed every communication period, the processing can be simply executed in comparison with a case that the processing is non-periodically executed by interrupt processing or the like. In accordance with at least an embodiment of the present invention, the temperature detecting section 74 may be structured so as to directly detect temperatures of the respective magnetic sensor parts 40, 50 and 60 based on resistance values of the magneto-sensitive elements in themselves. Alternatively, it may be structured that another resistance film (conducting layer which does not exhibit magneto-resistance effect) for monitoring temperature may be provided on each of circuit boards where the magnetic sensor parts 40, 50 and 60 are formed, and that the temperature detecting section 74 detects temperatures of the magnetic sensor parts 40, 50 and 60 based on the resistance values.

The offset voltage calculation section 75 executes calculation of offset voltages of the respective magnetic sensor parts 40, 50 and 60 based on output signals from the magnetic sensor parts 40, 50 and 60. Calculation of the offset voltage is executed for obtaining the information regarding temperature characteristics before the rotary encoder 10 is shipped from a factory and, in order to update the information, calculation of the offset voltage is also executed during operation of the rotary encoder 10. A specific example of a calculation method for an offset voltage in the offset voltage calculation section 75 will be described below.

The storage section 76 stores information regarding temperature characteristics of offset voltages of the respective magnetic sensor parts 40, 50 and 60 as described above. Specifically, the storage section 76 stores a slope and an intercept of a primary approximate expression which is previously calculated based on a relationship between temperatures previously detected by the temperature detecting section 74 and the offset voltages previously calculated by the offset voltage calculation section 75.

The calculation of the primary approximate expression is, as described above, executed before the rotary encoder 10 is shipped from a factory. Specifically, calculation of the offset voltage is executed 256 times every a minimum resolution (0.5° C.) of the temperature sensor during a period until temperature of each of the magnetic sensor parts 40, 50 and 60 rises to a predetermined temperature (for example, 30° C.) due to heat generated by a motor when the rotary encoder 10 is operated. Then, the averaged result is collected as a calculation value of the offset voltage at the temperature. A primary approximate expression is calculated based on data of the temperature and the offset voltage which are collected in this way and the slope and the intercept are stored in the storage section 76. The collected data are canceled after the primary approximate expression is calculated.

Therefore, according to this embodiment, in order to estimate an offset voltage based on a current temperature in a specific magnetic sensor part, it is sufficient that the storage section 76 stores only two informations (slope and intercept of the primary approximate expression). Therefore, capacity of the storage section 76 can be remarkably saved. Further, the information is obtained based on the data which are collected and accumulated before the rotary encoder 10 is shipped from a factory. Therefore, an offset voltage can be estimated with a high degree of accuracy immediately after shipment and a high degree of detection accuracy can be maintained.

Calculation of the primary approximate expression is executed by using a least-squares method. Specifically, when the total sum of temperatures previously detected is "A", the total sum of offset voltages previously calculated is "B", the total sum of products of the temperatures previously detected and the offset voltages previously calculated is "C", and the total sum of the squares of the temperatures previously detected is "D", the slope "a" and the intercept "b" are respectively obtained:

$a=(C-AB)/(D-A^2)$, and $b=(DB-CA)/(D-A^2)$.

When the rotary encoder 10 is used over a long time, a secular change (change over time) may be occurred in the offset voltages and the temperature characteristics of the magnetic sensor parts 40, 50 and 60. In this case, it may be structured that at least one of the slope and the intercept stored in the storage section 76 may be updated depending on the secular change. For example, at a predetermined temperature during operation of the rotary encoder 10, an offset voltage is calculated by the offset voltage calculation section 75 based on an actual output signal, and the calculation value is compared with an estimated value of the offset voltage at the temperature by the offset voltage estimation section 72. Then, when the difference is not less than a predetermined value, it may be structured that the difference is added to or subtracted from the intercept stored in the storage section 76 so that the primary approximate expression is moved in parallel, and the result is stored in the storage section 76 as a new intercept. On the other hand, it may be structured that collection of data and calculation of the primary approximate expression having been performed before delivery are executed again to update both of the slope and the intercept. Alternatively, it may be structured that the data collected before delivery are saved in the storage section 76 without being canceled and, whenever new data are acquired, the slope and the intercept are calculated by using the above-mentioned relational expression. In this case, it may be structured that the closest data are weighted and applied to the relational expression, a slope and an intercept where the temperature characteristic of the latest offset voltage is reflected are obtained.

Figure 3A:
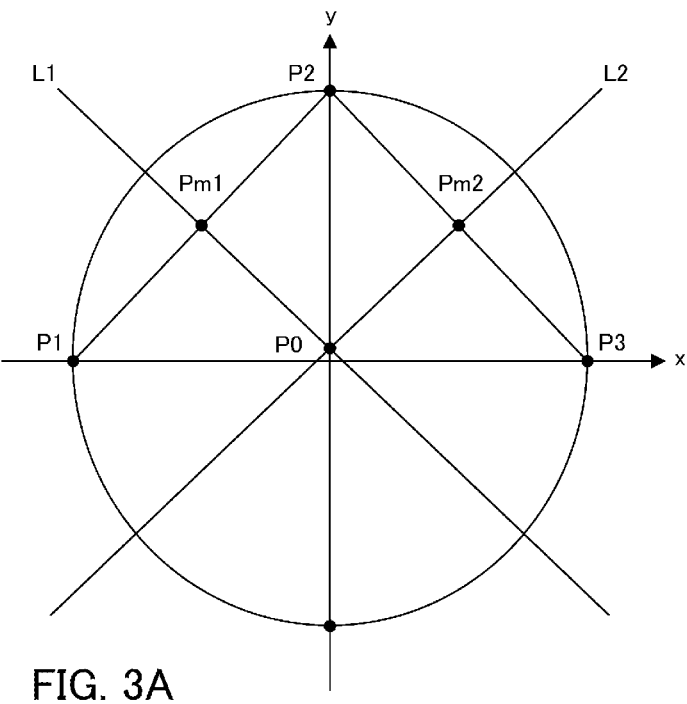
FIG. 3A and FIG. 3B are explanatory views showing a first calculation method for an offset voltage in a rotary encoder in accordance with an embodiment of the present invention.
Figure 3B:
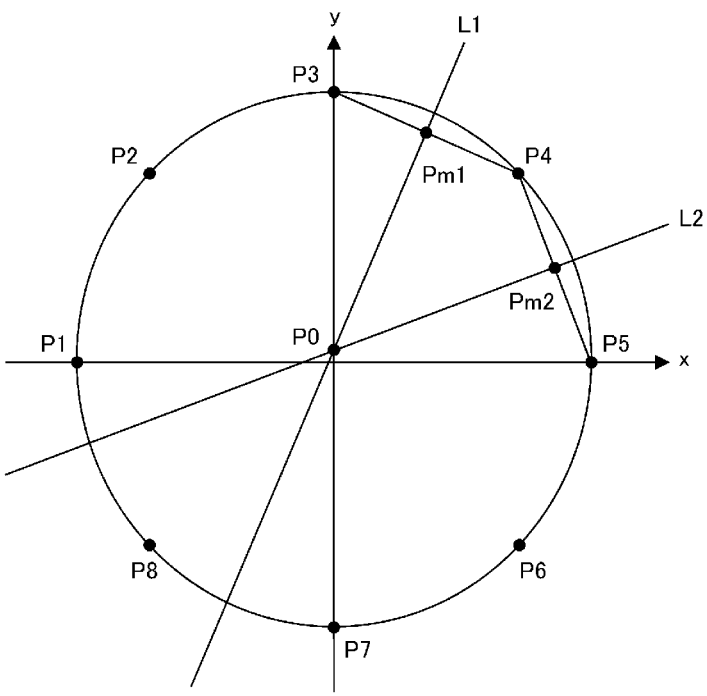
Figure 4A:
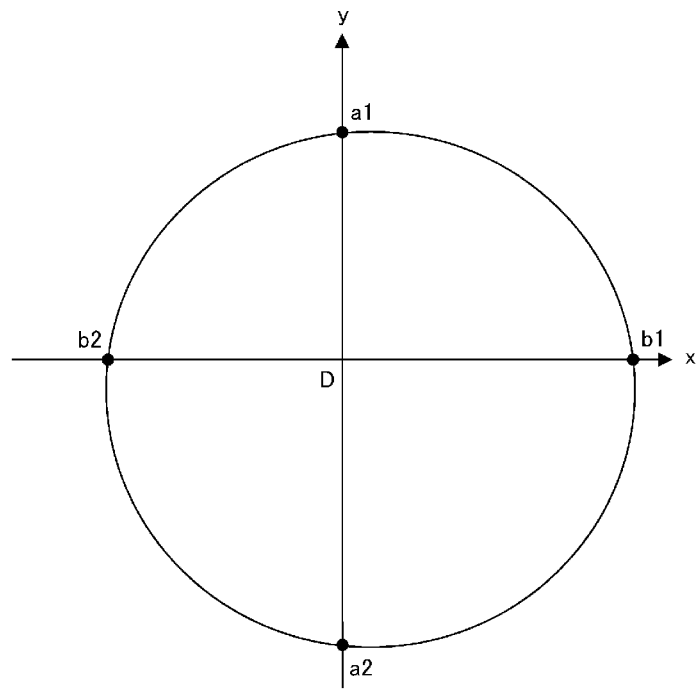
FIG. 4A and FIG. 4B are explanatory views showing a second calculation method for an offset voltage in a rotary encoder in accordance with an embodiment of the present invention.
Figure 4B:
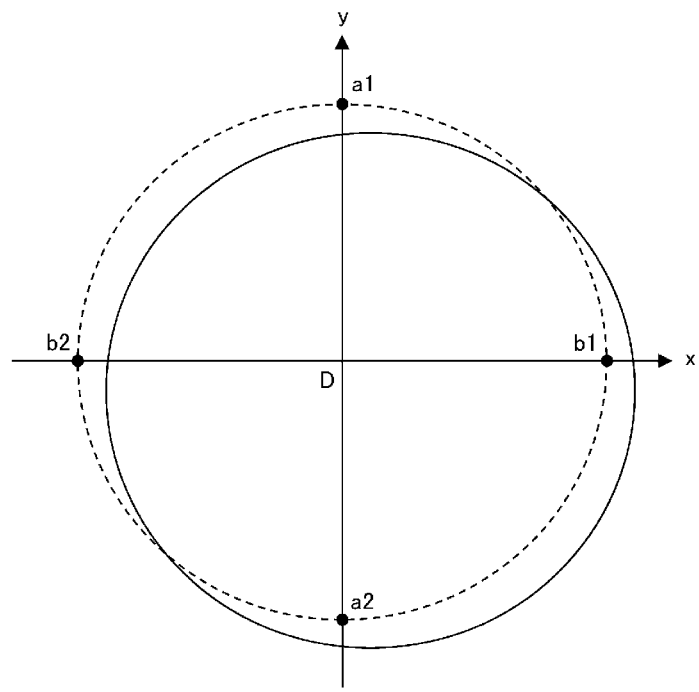

Next, two examples of a calculation method for an offset voltage in the offset voltage calculation section 75 will be briefly described below. A first calculation method is applied to the first magnetic sensor part 40, and a second calculation method is applied to the third magnetic sensor part 60. FIG. 3A and FIG. 3B are explanatory views showing the first calculation method and FIG. 4A and FIG. 4B are explanatory views showing the second calculation method.

In each of the calculation methods, first, a Lissajous waveform is calculated on rectangular coordinates based on output signals ("A"-phase signal and "B"-phase signal) shown in FIG. 2A (see the broken line in FIG. 2B). A Lissajous waveform is a waveform which is obtained so that the "B"-phase signal (cos) is plotted on the x-axis of a rectangular coordinate system and the "A"-phase signal (sin) is plotted on the y-axis of the rectangular coordinate system. When it is supposed that the "A"-phase signal and the "B"-phase signal are ideal sine-waves, the Lissajous waveform becomes a circle without center deviation and distortion and the offset voltage is zero. However, actually, the Lissajous waveform becomes a circle having center deviation and distortion due to variations of MR elements and geometric factors and thus an offset voltage is generated.

In the first calculation method, after a Lissajous waveform is calculated, a plurality of points equally dividing circumference of the Lissajous waveform is specified, and successive three points are selected from the plurality of the points. Next, perpendicular bisectors of two line segments respectively formed by connecting successive two points of the selected three points are obtained, and an intersecting point is calculated as an offset voltage. FIG. 3A and FIG. 3B are explanatory views showing the calculation method. FIG. 3A shows an example in which an offset voltage is calculated from a plurality of points which divides the Lissajous waveform into four equal parts, and FIG. 3B shows an example in which an offset voltage is calculated from a plurality of points which divides the Lissajous waveform into eight equal parts.

In an example shown in FIG. 3A, four intersecting points "P1" through "P4" with the coordinate axes (x-axis and y-axis) are specified as a plurality of points which divides the Lissajous waveform into four equal parts, and the points "P1" through "P3" are selected as successive three points. Next, the intersecting point "P0" formed by the perpendicular bisector "L1" passing the midpoint "Pm1" of the line segment "P1-P2" and the perpendicular bisector "L2" passing the midpoint "Pm2" of the line segment "P2-P3" is calculated as an offset voltage. Commonly, in the Lissajous waveform, distortion is low at an intersecting point with the coordinate axis. In this example, an offset voltage can be calculated as an extremely accurate value and, in addition, even in a case that distortion is generated in the Lissajous waveform, the offset voltage can be calculated with a sufficient degree of accuracy without executing correction. Further, in this example, an offset voltage can be calculated only by turning the first magnet 20 by 180° in an electrical angle, in other words, 90° in a machine angle.

In an example shown in FIG. 3B, eight points "P1" through "P8" are specified as a plurality of points which divides the Lissajous waveform into eight equal parts. The eight points "P1" through "P8" are four intersecting points with the coordinate axes and four points which equally divide parts between the four intersecting points. The points "P3" through "P5" are selected as successive three points. Next, the intersecting point "P0" formed by the perpendicular bisector "L1" passing the midpoint "Pm1" of the line segment "P3-P4" and the perpendicular bisector "L2" passing the midpoint "Pm2" of the line segment "P3-P4" is calculated as an offset voltage. In a case that successive three points are to be selected from the eight points "P1" through "P8", at least one point is an intersecting point of the Lissajous waveform with the coordinate axis, but other points (another point) are located at positions of ±45 degrees with respect to the origin and correspond to intersecting points of the "A"-phase signal with the "B"-phase signal. At these positions, distortion of the Lissajous waveform is large and thus it is preferable to use values after distortion has been corrected so as to become an ideal circle. As a result, an offset voltage obtained by the intersecting point "P0" can be calculated as an extremely accurate value. Further, in this example, an offset voltage can be calculated only by turning the first magnet 20 by 90° in an electrical angle, in other words, 45° in a machine angle.

As described above, according to the first calculation method, even when the rotor body 2 is permitted to be turned only over a limited angular range, an offset voltage can be calculated with a high degree of accuracy. Distortion of the obtained Lissajous waveform in the first magnetic sensor part 40 is low and thus, when the first calculation method is used, an offset voltage can be calculated by rotating the rotor body 2 over a small angle with a high degree of accuracy. In this calculation method, in order to simplify the processing, the intersecting point of the Lissajous waveform with the coordinate axis can be calculated from a combination of a value when one of the "A"-phase signal and the "B"-phase signal becomes zero and the other value.

In the second calculation method, after a Lissajous waveform is calculated, four points are specified which are located in the vicinities of respective four intersecting points of the Lissajous waveform with the coordinate axes (x-axis and y-axis). Next, a predetermined value is calculated as an offset voltage so that, when the predetermined value is added to or subtracted from at least one of the "A"-phase signal and the "B"-phase signal, the specified four points are separated from the origin by substantially equal distances, the predetermined value is determined as the offset voltage. This calculation method will be specifically described below with reference to FIG. 4A and FIG. 4B.

First, as shown in FIG. 4A, two points "a1" and "a2" are specified which are located in the vicinities of two intersecting points of the Lissajous waveform with the y-axis. Further, two points "b1" and "b2" are specified which are located in the vicinities of two intersecting points of the Lissajous waveform with the x-axis, and totaled four points are specified. In this case, the four points "a1", "a2", "b1" and "b2" are respectively located on the circumference of the Lissajous waveform and, when an offset voltage is existed, a distance at the point "a1" from the origin "D" of the coordinate axis is different from a distance at the point "a2", and a distance at the point "b1" from the origin "D" is different from a distance at the point "b2". In the drawing, the four points "a1", "a2", "b1" and "b2" are respectively indicated on the intersecting points of the Lissajous waveform with the coordinate axes. However, actually, the four points "a1", "a2", "b1" and "b2" are not always coincided with the intersecting points. In order to specify the four points, for example, as described above, a method may be used in which four points are obtained from combinations of values when one of the "A"-phase signal and the "B"-phase signal becomes zero (alternatively, within a predetermined range) and the other values.

Next, a predetermined value is added to or subtracted from the "A"-phase signal (sin) so that a distance between the point "a1" and the origin "D" and a distance between the point "a2" and the origin "D" are substantially equal to each other. Specifically, it is judged whether a value of "a1+a2" becomes within a predetermined region or not and, when the value is not within the predetermined region, a predetermined value is added to or subtracted from the "A"-phase signal so that the value of "a1+a2" is set within the predetermined region. Similarly, a predetermined value is added to or subtracted from the "B"-phase signal (cos) so that a distance between the point "b1" and the origin "D" and a distance between the point "b2" and the origin "D" are substantially equal to each other. Specifically, it is judged whether a value of "b1+b2" becomes within a predetermined region or not and, when the value is not within the predetermined region, a predetermined value is added to or subtracted from the "B"-phase signal so that the value of "b1+b2" is set within the predetermined region. In the example shown in FIG. 4A, a value of "a1+a2" is not more than a lower limit of a predetermined range and thus a predetermined value is added to the "A"-phase signal so that the Lissajous waveform is moved to a positive direction of the y-axis. Further, a value of "b1+b2" is not less than an upper limit of a predetermined range and thus a predetermined value is subtracted from the "B"-phase signal so that the Lissajous waveform is moved to a negative direction of the x-axis. As a result, as shown by the broken line in FIG. 4B, the specified four points "a1", "a2", "b1" and "b2" are respectively located at substantially equal positions from the origin "D" and the offset voltages are calculated from the respective predetermined values.

In accordance with at least an embodiment of the present invention, it may be structured that a predetermined value which is added to or subtract from the respective "A"-phase signal and the "B"-phase signal is set to be a minute value (for example, a decimal value of less than 1 (one)), a series of steps, i.e., calculation of the Lissajous waveform, specifying four points, and adding or subtracting a predetermined value, is repeatedly executed so that distances between the four points "a1", "a2", "b1" and "b2" and the origin "D" gradually become equal to each other. As a result, calculation accuracy of an offset voltage can be improved. Further, it may be structured that a predetermined value is added to or subtracted from only one of the "A"-phase signal and the "B"-phase signal to correct the Lissajous waveform. In addition, in order to reduce a load of arithmetic processing, it may utilize an approximate expression of "sin θ1=θ1" for the "A"-phase signal, and an approximate expression of "cos θ2=cos(θ1+π/2)=−sin θ2=−θ2" for the "B"-phase signal.

As described above, according to the second calculation method, even when distortion of the obtained Lissajous waveform is relatively large, calculation accuracy of the offset voltage can be improved. Therefore, the second calculation method is used in the third magnetic sensor part 60 whose distortion of the obtained Lissajous waveform is large in comparison with the first magnetic sensor part 40.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotary encoder structured to detect a rotation position of a rotor body with respect to a fixed body, the rotary encoder comprising:
    a magnet which is provided in one of the fixed body and the rotor body;
    a magnetic sensor part which is provided in the other of the fixed body and the rotor body so as to face the magnet and is structured to detect a magnetic field change of the magnet; and
    a control part configured to calculate a rotation position of the rotor body based on an output signal outputted from the magnetic sensor part accompanied with rotation of the rotor body;
    wherein the control part comprises:
        a temperature detecting section configured to detect temperature of the magnetic sensor part;
        an offset voltage calculation section configured to calculate an offset voltage of the magnetic sensor part based on the output signal from the magnetic sensor part; and
        a storage section configured to store a slope and an intercept of a primary approximate expression which is calculated by a relationship between temperatures previously detected by the temperature detecting section and the offset voltages previously calculated by the offset voltage calculation section;
    wherein the primary approximate expression is obtained so that, during a time when temperature of the magnetic sensor part rises due to heat generated by operation of the rotary encoder, calculation of the offset voltage is successively executed at a number of temperatures and, when a total sum of the temperatures previously detected is "A", a total sum of the offset voltages previously calculated is "B", a total sum of products of the temperatures previously detected and the offset voltages previously calculated is "C", and a total sum of squares of the temperatures previously detected is "D", the slope "a" and the intercept "b" are given by:

$a=(C-AB)/(D-A^2)$, and $b=(DB-CA)/(D-A^2)$, and the slope and the intercept of the primary approximate expression are stored in the storage section;
    wherein the control part is configured to perform:
        offset voltage estimate processing which estimates an offset voltage of the magnetic sensor part from current temperature of the magnetic sensor part detected by the temperature detecting section based on the slope and the intercept which are stored in the storage section; and
        correction processing which corrects the output signal from the magnetic sensor part based on the estimated offset voltage;
    wherein the control part is configured to calculate a rotation position of the rotor body by using a corrected output signal;
    wherein the control part is configured such that, in a case that a difference between the offset voltage calculated by the offset voltage calculation section at a predetermined temperature and the offset voltage estimated at the predetermined temperature is not less than a predetermined value, the control part updates the intercept stored in the storage section based on the difference;
    wherein the magnet comprises a plurality of magnets and the magnetic sensor part comprises a plurality of magnetic sensor pans; and
    wherein the control part is configured to calculate a rotation position of the rotor body based on a plurality of the output signals of the plurality of the magnetic sensor parts while the control part executes the offset voltage estimate processing based on the slope and the intercept stored in the storage section and the correction processing for the plurality of the magnetic sensor parts.

2. The rotary encoder according to claim 1, wherein
    the plurality of the magnets comprises a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body,
    the plurality of the magnetic sensor parts comprises at least one magnetic sensor part which faces the first magnet, and a magnetic sensor part which faces the second magnet,
    the plurality of the magnetic sensor parts comprises:
        a first magneto-sensitive element which is disposed so as to face a magnetized face of the magnet and is structured to output an "A"-phase signal in a sine wave shape accompanied with rotation of the rotor body; and
        a second magneto-sensitive element which is disposed so as to face the magnetized face of the magnet and is structured to output a "B"-phase signal in a sine wave shape having a phase difference of 90° with respect to the "A"-phase signal accompanied with rotation of the rotor body.

3. The rotary encoder according to claim 2, wherein the offset voltage calculation section is configured to perform:
    forming a Lissajous waveform on a rectangular coordinate system based on the "A"-phase signal and the "B"-phase signal;
    selecting successive three points from a plurality of points equally dividing circumference of the Lissajous waveform; and
    calculating the offset voltage of at least the one magnetic sensor part corresponding to the first magnet based on an intersecting point of perpendicular bisectors of two line segments formed by connecting successive two points of selected three points.

4. The rotary encoder according to claim 2, wherein the offset voltage calculation section is configured to perform:
    forming a Lissajous waveform on a rectangular coordinate system based on the "A"-phase signal and the "B"-phase signal;
    specifying four points which are located in vicinities of four intersecting points of the Lissajous waveform and the coordinate axes; and
    calculating the offset voltage of the magnetic sensor part corresponding to the second magnet based on a predetermined value, the predetermined value being added to or subtracted from at least one of the "A"-phase signal and the "B"-phase signal so that the four points specified are substantially equally separated from an origin of the coordinate axes.

5. The rotary encoder according to claim 2, wherein each of the magneto-sensitive elements comprises a magneto-resistance effect element.

6. The rotary encoder according to claim 1, wherein the temperature detecting section is configured to calculate the temperature of the magnetic sensor part by using a temperature sensor incorporated into a microcomputer which structures the control part.

7. A rotary encoder structured to detect a rotation position of a rotor body with respect to a fixed body, the rotary encoder comprising:
- a magnet which is provided in one of the fixed body and the rotor body;
- a magnetic sensor which is provided in the other of the fixed body and the rotor body so as to face the magnet and is structured to detect a magnetic field change of the magnet; and
- a controller configured to calculate a rotation position of the rotor body based on an output signal outputted from the magnetic sensor accompanied with rotation of the rotor body;
- wherein the controller is configured to perform:
  - detecting temperature of the magnetic sensor;
  - calculating an offset voltage of the magnetic sensor based on the output signal from the magnetic sensor; and
  - storing a slope and an intercept of a primary approximate expression which is calculated by a relationship between temperatures previously detected and offset voltages previously calculated;
  - estimating an offset voltage of the magnetic sensor from current temperature of the magnetic sensor detected by the temperature detecting section based on the slope and the intercept; and
  - correcting the output signal from the magnetic sensor based on the estimated offset voltage to generate a corrected output signal; and
  - calculating a rotation position of the rotor body by using the corrected output signal; and
- wherein the primary approximate expression is obtained so that, during a time when temperature of the magnetic sensor part rises due to heat generated by operation of the rotary encoder, calculation of the offset voltage is successively executed at a number of temperatures and, when a total sum of the temperatures previously detected is "A", a total sum of the offset voltages previously calculated is "B", a total sum of products of the temperatures previously detected and the offset voltages previously calculated is "C", and a total sum of squares of the temperatures previously detected is "D", the slope "a" and the intercept "b" are given by, $$a=(C-AB)/(D-A^2),\text{ and}$$

$$b=(DB-CA)/(D-A^2),$$

and the slope and the intercept of the primary approximate expression are stored in the storage section:
- wherein the control part is configured such that, in a case that a difference between the offset voltage calculated by the offset voltage calculation section at a predetermined temperature and the offset voltage estimated at the predetermined temperature is not less than a predetermined value, the control part updates the intercept stored in the storage section based on the difference;
- wherein the magnet comprises a plurality of magnets and the magnetic sensor part comprises a plurality of magnetic sensor parts; and
- wherein the control part is configured to calculate a rotation position of the rotor body based on a plurality of the output signals of the plurality of the magnetic sensor parts while the control part executes the offset voltage estimate processing based on the slope and the intercept stored in the storage section and the correction processing for the plurality of the magnetic sensor parts.

* * * * *